United States Patent [19]
Tamaki et al.

[11] Patent Number: 5,011,702
[45] Date of Patent: Apr. 30, 1991

[54] PROCESS FOR PRODUCING TEXTURED PROTEIN FOOD MATERIALS

[75] Inventors: Kimie Tamaki, Tokyo; Tsuguaki Nishiya, Sayama; Kiyoshi Tatsumi, Iruma, all of Japan

[73] Assignee: Snow Brand Milk Products Co., Ltd., Sapporo, Japan

[21] Appl. No.: 466,641

[22] Filed: Jan. 17, 1990

[51] Int. Cl.5 ............................................. A23C 21/00
[52] U.S. Cl. .................................... 426/583; 426/574; 426/656; 426/657
[58] Field of Search ................ 426/583, 656, 657, 574

[56] References Cited

U.S. PATENT DOCUMENTS 4,161,546  7/1979  Akin et al. ........................... 426/104
4,338,340  7/1982  Morimoto et al. ................... 426/104

Primary Examiner—Donald E. Czaja
Assistant Examiner—Helen Pratt
Attorney, Agent, or Firm—Fleit, Jacobson, Cohn, Price, Holman & Stern

[57] ABSTRACT

The present invention provides a process for producing protein food materials which comprises heating a solution containing whey protein as the major component, and freezing the solution in a stationary state to obtain textured protein food materials.

5 Claims, 4 Drawing Sheets

PROCESS FOR PRODUCING TEXTURED PROTEIN FOOD MATERIALS

BACKGROUND OF THE INVENTION

The present invention relates to a process for producing protein food materials that a solution containing whey protein as the major component can be textured in accordance with the purposes to obtain analogues of food materials of fruit, meat or fish.

Conventionally, when the whey protein which is obtained as a by-product of cheese or casein is used as food materials, the use is limited to additive materials in the field of food processing. The other hand, when the whey protein is used as main materials of food, it is proposed that the whey protein is textured by heating and pressing with an extruder (Japanese Publication of Unexamined Patent Application NO. 62-14747). However, the method is limited to meat imitations.

SUMMARY OF THE INVENTION

The present invention intends to use whey protein as food materials covering wide fields and provides a method for producing food materials having textured like those of fruit, meat and fish in accordance with the use object. The present invention provides a method comprising texturing the whey protein digestible and absorbable.

The following description illustrates the present invention more specifically.

The present invention is characterized in that it comprises heating a solution which contains whey protein as the major component and freezing the solution in a stationary state to obtain textured protein food materials.

The term "textured" means to give fresh, fiber or stratified textures to the whey protein.

DETAILED DESCRIPTION OF THE INVENTION

Figure 1:
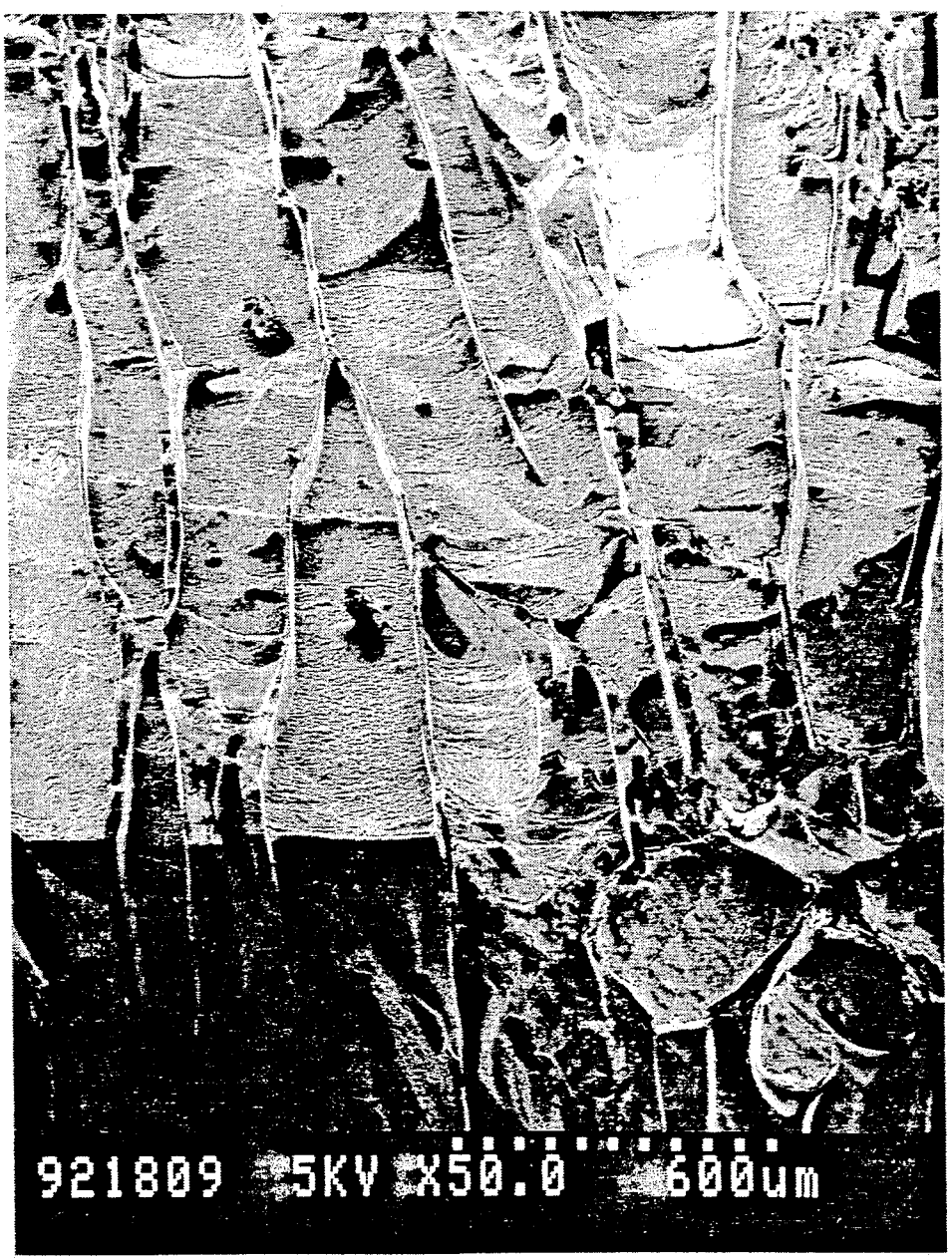
FIG. 1 is a cryoscanning electron microphotograph of the frozen WPC gel obtained in Example 1.

In the present invention, a solution which principally contains whey protein is used as starting materials and the protein concentration is preferably 5 to 50% by weight. When the protein concentration is less than 5% by weight, it is difficult to obtain texture having shape retention even if the solution is heated and frozen. The other hand, when the protein concentration is above 50% by weight, it is difficult to mix or stir the solution. Such problems are not preferable in the practical use.

The present invention comprises heating the whey protein having the above concentration at a temperature of 55° to 170° C. The heating temperature can be selected by the use of the obtained protein food materials so as to fit for the taste and cooking. When the heating temperature is below 55° C., the protein can not be textured by heating and freezing. When the heating temperature is above 170° C., it is not preferable because considerable color changes occur and the obtained materials have burning tastes.

The pH value of the solution principally containing the whey protein is controlled to 6.0–9.0, preferably 6.5–8.0, or controlled to 4.0 or less. When the pH value is above 4.0 and below 6.0, the textured materials are not obtained after freezing because the protein is aggregated by heating and a milky turbidity appears.

Moreover, when the pH value of the solution is above 9.0, the taste does not fit for food materials. For obtaining acidic food materials, the pH value is adjusted to below 4.

Accordingly, when the pH value of the solution principally containing the whey protein is not in the above range, it is adjusted to the above range by adding organic acids such as citric acid, malic acid, lactic acid, succinic acid, acetic acid and the like or alkalies such as sodium bicarbonate, sodium hydroxide, calcium hydroxide and the like.

As described above, after heating the solution principally containing the whey protein, the solution is frozen in a stationary state. The freezing is preferably conducted at a temperature of −10° C. or less, and the freezing time and the freezing velocity is optionally determined in accordance with the aimed texture form.

The term "frozen in a stationary state" means that the whole system of the solution principally containing the whey protein is maintained and freezing in a stationary state.

Accordingly, it corresponds to the above freezing in a stationary state that the above protein solution is continuously frozen by moving a conveyor on which the solution contained in a freezing box at a stationary state is carried.

According to the present invention, it becomes possible to obtain stable textures of the whey protein by heating the solution principally containing the whey protein and by freezing it in a stationary state.

Namely, when the whey protein is modified by heating at a certain condition and by freezing in a stationary state, stable textures are obtained. As a result, a process for solidifying or stabilizing the protein textures after freezing by using ethanol or acid or by freeze-drying is not required.

Furthermore, in the process of the present invention, after the frozen protein or the semi-melted protein is textured by dipping in a seasoning liquid containing calcium or magnesium ion, the textured protein can be further stabilized. According to the present invention, the final freezing temperature can be raised and the production cost can be lowered.

The textures of the textured protein obtained by the process as described above can be modified to desired forms such as mesh, fiber and stratified textures.

For example, after a solution principally containing protein having a concentration of 8 to 10% by weight is heated at a temperature of 80° to 130° C. for two seconds to five minutes, it is frozen at a product temperature of −17° to −23° C. for six to 14 hours in a stationary state. The obtained texture has a juicy fruit form. After a solution principally containing protein having a concentration of 9 to 11% by weight is heated at 65° to 75° C., it is frozen at a storage temperature of −20° to −25° C. in a stationary state. The obtained texture has raw meat form. After a solution principally containing protein having a concentration of 8 to 12% by weight is heated at 80° to 130° C. for 30 seconds to 20 minutes, it is slowly frozen at a product temperature of −30° C. for 20 to 28 hours in a stationary state. The obtained texture has fish or meat form. By fabricating the latter texture with an extruder and the like, food material having a fishlike texture containing fine fiber can be obtained.

As described above, according to the present invention, the pH value of the solution principally containing the whey protein is adjusted and the solution is heated and frozen in the stationary state. Only these steps are adopted, protein food materials having various kinds of textures which resemble fruit textures, raw meat textures, meat textures and fish textures can be prepared by simple operation. Accordingly, the whey protein containing nutritive elements can be widely used as food materials.

DESCRIPTION OF PREFERRED EMBODIMENTS

The following Examples illustrate the present invention more specifically.

EXAMPLE 1

Dry powder 125 g of whey protein concentrate (protein content: 75% by weight, SAVORPRO 7502 manufactured by Express Foods Company) was dissolved in deionized water to obtain 1000 g of WPC aqueous solution and the WPC solution was allowed to stand overnight at 5° C. The WPC solution was heated with shaking in a constant temperature bath at 70° C. for 0, 5, 15, 25 and 35 minutes, respectively. Then, each WPC solution was cooled with stirring in an ice bath. 15 g portions of the WPC solution were pipetted into 25 ml polyethylene centrifuge tubes and frozen for 16 hours at −18° C. in a freezer.

Figure 2:
FIG. 2 is a cryoscanning electron microphotograph of a film section of the frozen WPC gel obtained in Example 1.
Figure 3:
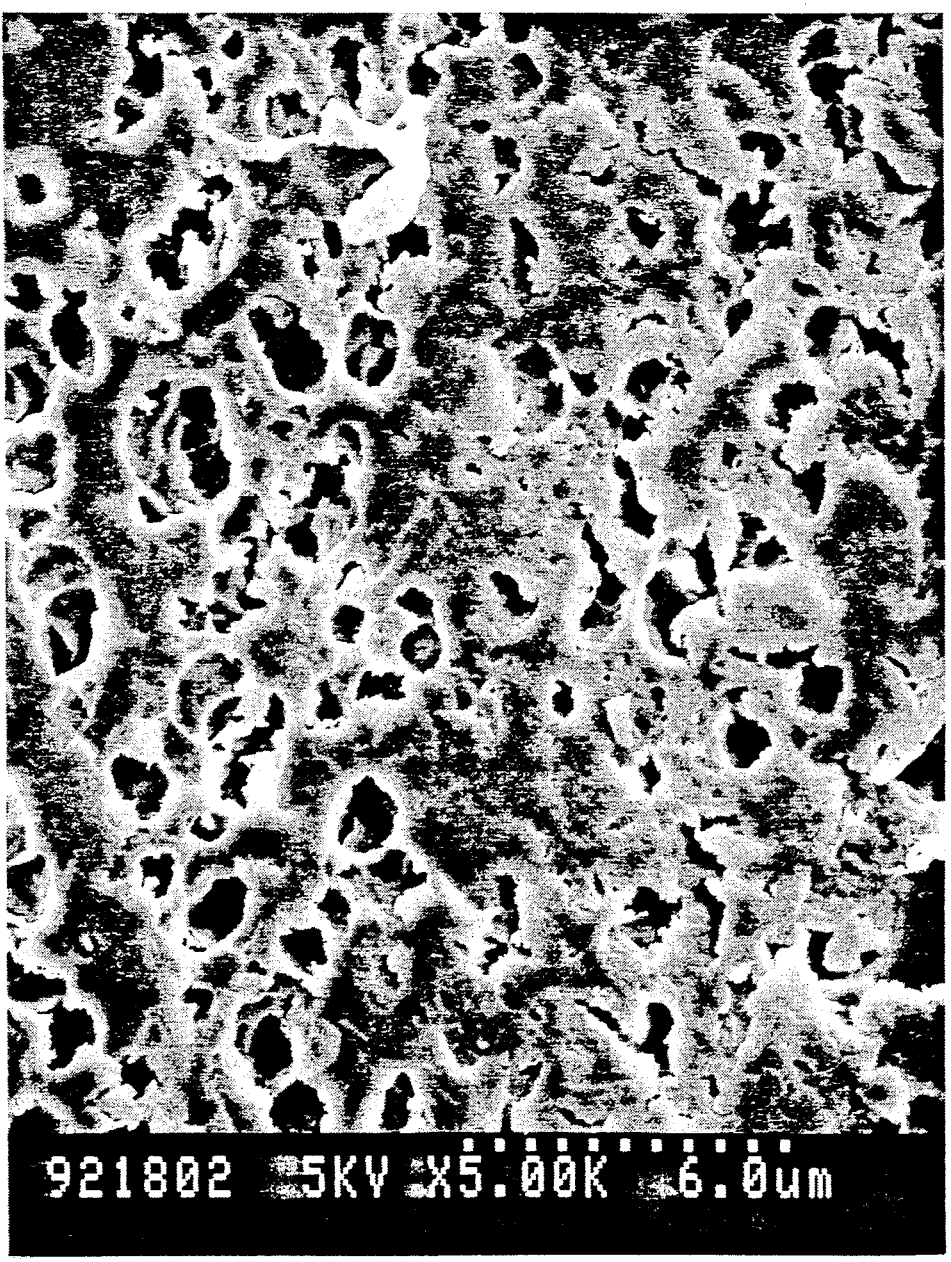
FIG. 3 is a cryoscanning electron microphotograph of a porous film section of the frozen WPC gel obtained in Example 1.

The frozen WPC solution which had been heated for 35 minutes was observed by using a cryoscanning electron microscope. The results are shown in FIGS. 1–3. Apparently, the frozen WPC was textured.

Figure 4:
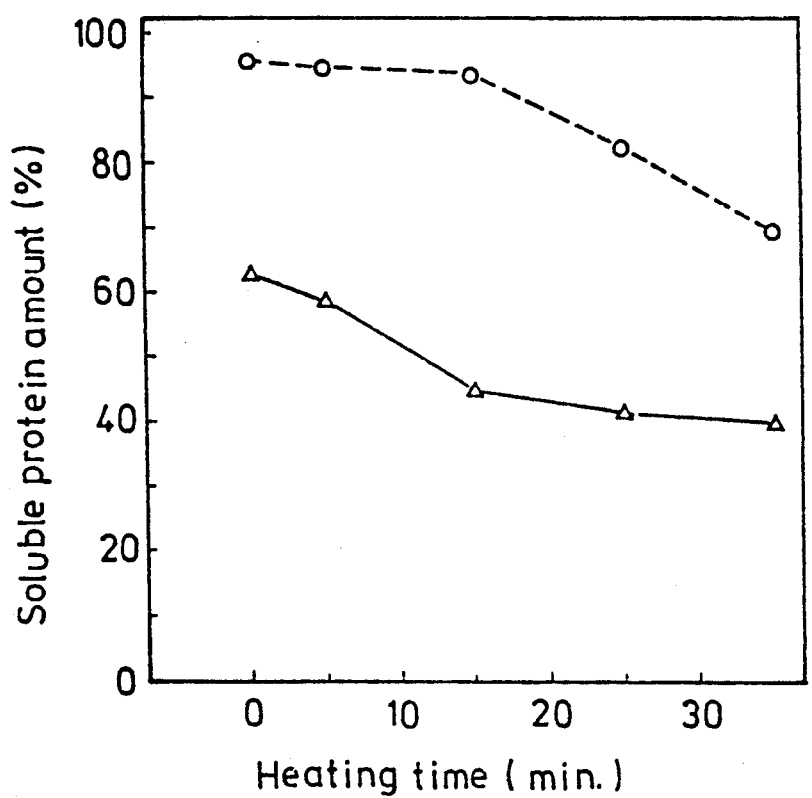
FIG. 4 is a graph showing soluble protein amounts of the frozen WPC solution and the heated WPC solution obtained in Example 1. Circle marks show the soluble protein amounts of the heated WPC solution (heating time: 0, 5, 15, 25 and 35 minutes) and triangle marks show the soluble protein amounts of the frozen WPC solution (heating time: 0, 5, 15, 25 and 35 minutes).

Each frozen WPC solution was molten at 5° C. for 8 hours and the solution was centrifuged at 27,000 g for 20 minutes. The soluble protein concentration of the supernatant liquid was determined by a lowry method. On the other hand, the heated WPC solution, namely the WPC solution obtained after heating and before freezing, was used as a control. The soluble protein concentration of the control was likewise determined. A soluble protein amount of the WPC solution which was not heated was valued at 100. The results are shown in FIG. 4. The soluble protein amount of the frozen WPC solution was less than that of the heated WPC solution.

Further, after melting each frozen WPC solution, the solution was allowed to stand at 20° C. for one hour and the gel strength was measured with a rheometer by maximum stress when sample were pressed on a plate to a height of 3 mm at a pressing speed of 2 cm/min. under the circumstances of 20° C. and 60% humidity.

The results are shown in Table 1.

TABLE 1

| Heating time (min.) | Gel strength (g) |
| --- | --- |
| Not heated | — |
| 0 | — |
| 5 | — |
| 15 | 743 |
| 25 | 1328 |
| 35 | 1510 |

EXAMPLE 2

The same whey protein concentrate 120 g as used in Example 1, granulated sugar 70 g, an apple flavor 2 g and a natural coloring matter 6 g were dissolved in water and citric acid was added until a pH of 3.8 was reached. A whey protein solution 1000 g was obtained. Then, the solution was heated to a temperature of 130° C. for two seconds, poured in a vessel of 80 ml and frozen for ten hours in a stationary state. The final freezing product temperature was −25° C. The obtained product had a juicy baked apple taste.

EXAMPLE 3

The same whey protein concentrate 115 g as used in Example 1, a chicken extractive 10 g of seasonings, and a small quantity of essence and coloring matters were dissolved in water and 1000 g of a whey protein solution (pH 6.9) was prepared.

Then, the solution was heated to a temperature of 70° C. for 20 minutes and it was poured in an oval vessel of 70 ml. The surface of the solution cooled was placed so as to arrange the frozen crystals perpendicularly in the direction of the major axis. The solution was frozen in a stationary state for ten hours to obtain a final freezing product temperature of −25° C. The frozen product was molten. The molten product had a taste of raw white meat of chicken. When the molten product was heated in a seasoning solution, it coagulated and fibrilated like cooked chicken meat. Tough protein food having good taste could be obtained.

EXAMPLE 4

The same whey protein concentrate 1.6 kg as used in Example 1 and a small quantity of coloring matters were dissolved in water to obtain 10 kg of the whole quantity and a whey protein solution (pH 7.1) was prepared. After the solution was heated at 80° C. for 20 minutes, it was frozen slowly in a stationary state for 24 hours to obtain needle-like crystals and a final frozen product temperature of −30° C.

The frozen product was ground. Vegetable oil 1.0 kg, a codfish flavor 20 g of seasonings and a sweet sake 550 g were mixed to the product. The mixture was heated at 140° C. by using an extruder to obtain protein food having a taste of fish meat and containing fine fibers.

EXAMPLE 5

The same whey protein concentrate 125 g as used in Example 1, granulated sugar 85 g and a small quantity of flavors were dissolved in water to obtain 1000 g of the whole quantity. A whey protein solution (pH 6.9) was prepared.

Then, after the solution was heated at 80° C. for 3 minutes, it was poured in a globular vessel of 130 ml and frozen slowly in a stationary state for 8 hours to a final product temperature of −15° C.

The frozen product was dipped in syrup which was prepared by dissolving a water-soluble calcium salt 3 g, granulated sugar 150 g, citric acid 30 g and a small quantity of flavors and coloring matters in water to obtain 1000 g of the whole quantity, and the product was molten.

The obtained product was protein food having a mesh texture and a taste resembling a white peach boiled with syrup.

EXAMPLE 6

The same whey protein concentrate 300 g as used in Example 1, a cheese flavor 5 g and a coloring matter of β-carotene 5 g were dissolved in water to obtain 1000 g of the whole quantity, and a whey protein solution (pH 6.9) was prepared.

Then, after the solution was heated at 80° C. for 20 minutes, it was frozen for 7 hours in a stationary state to a final product temperature of −20° C. The obtained frozen product was dipped in a 3% aqueous solution of sodium chloride. The seasoned molten material had a taste resembling natural cheese which was more fragile than aggregated albumen.

We claim:

1. A process for producing textured protein food materials consisting essentially of the steps heating a solution containing whey protein as the major component, and freezing the solution in a stationary state to obtain textured protein food materials.

2. A process as claimed in claim 1, wherein the solution containing the whey protein as the major component contains 5% to 50% protein by weight.

3. A process as claimed in claim 1, wherein the heating temperature is from 55° to 170° C.

4. A process as claimed in claim 1, wherein the pH value of the solution containing the whey protein is from 6 to 9.

5. A process as claimed in claim 1, wherein the pH value of the solution containing the whey protein is from 4 or less.

* * * * *